United States Patent
Jang

(10) Patent No.: US 8,448,736 B2
(45) Date of Patent: May 28, 2013

(54) BICYCLE DERIVING DRIVING FORCE BY MOTOR-GENERATOR

(76) Inventor: Suk Ho Jang, Seoul (KR)

( * ) Notice: Subject to any disclaimer, the term of this patent is extended or adjusted under 35 U.S.C. 154(b) by 0 days.

(21) Appl. No.: 13/261,034

(22) PCT Filed: Jul. 14, 2009

(86) PCT No.: PCT/KR2009/003836
§ 371 (c)(1),
(2), (4) Date: Nov. 21, 2011

(87) PCT Pub. No.: WO2010/134664
PCT Pub. Date: Nov. 25, 2010

(65) Prior Publication Data
US 2012/0061161 A1    Mar. 15, 2012

(30) Foreign Application Priority Data
May 21, 2009   (KR) .................... 10-2009-0044268

(51) Int. Cl.
*B62M 6/60*         (2010.01)
(52) U.S. Cl.
USPC ............................................. 180/206.5
(58) Field of Classification Search
USPC ................ 180/206.1, 206.2, 206.5, 206.7
See application file for complete search history.

(56) References Cited

U.S. PATENT DOCUMENTS

| | | | | |
|---|---|---|---|---|
| 3,921,741 A * | 11/1975 | Garfinkle et al. | .......... | 180/206.2 |
| 3,921,745 A * | 11/1975 | McCulloch et al. | ....... | 180/206.1 |
| 5,144,183 A * | 9/1992 | Farrenkopf | .................... | 310/268 |
| 5,910,714 A * | 6/1999 | Buchanan et al. | ............ | 318/139 |
| 6,062,329 A * | 5/2000 | Chai | .......................... | 180/206.5 |
| 6,173,801 B1 * | 1/2001 | Kakutani et al. | .............. | 180/220 |
| 6,247,548 B1 * | 6/2001 | Hayashi et al. | ............. | 180/206.2 |
| 6,347,682 B1 * | 2/2002 | Buchner | ....................... | 180/220 |
| 6,588,528 B2 * | 7/2003 | Ligman | ..................... | 180/206.2 |
| 8,047,320 B2 * | 11/2011 | Hadley | ...................... | 180/206.5 |
| 2003/0047369 A1* | 3/2003 | Katagiri et al. | ............... | 180/206 |
| 2005/0252706 A1* | 11/2005 | Thomas | ........................ | 180/205 |
| 2006/0070784 A1* | 4/2006 | Tahara | ......................... | 180/205 |
| 2008/0066984 A1* | 3/2008 | Holland | ....................... | 180/207 |
| 2008/0278014 A1* | 11/2008 | Chen | ............................. | 310/114 |

* cited by examiner

Primary Examiner — Tony Winner
(74) Attorney, Agent, or Firm — GWiPS

(57) ABSTRACT

Disclosed is a bicycle which is a means of short-distance movement favored by men and women of all ages. The present invention is an application of a bicycle having a motor-generator disclosed in Korean Patent Application No. 2009-035298 that the applicant of the present invention filed. Namely, a motor-generator is mounted on a side of the rear wheel of the bicycle, and a control box and a battery are mounted under the main pipe of the bicycle, and a change-over switch and a change speed switch are mounted on the handle of the bicycle. The present invention makes it possible to charge quickly and effectively via a motor-generator that is operated by the bicycle driving force on a downhill or level ground, and with charging made, the rotary force of the motor-generator is conveyed to the rear wheel to generate electric power, so that electromotive force is produced and stored by itself, and the driving force of the bicycle can be obtained by using the stored electric power. Therefore, it is possible to use the bicycle easily and conveniently for a long time, and it has an effect of much reduced leg fatigue even in the case of moving a long distance.

6 Claims, 4 Drawing Sheets

BICYCLE DERIVING DRIVING FORCE BY MOTOR-GENERATOR

TECHNICAL FIELD

The present invention relates to a bicycle which is a means of short-distance movement favored by men and women of all ages, and more specifically to a bicycle in which a motor-generator is mounted on the rear wheel of the bicycle, and the electric power obtained from the motor-generator is stored in a separate battery, and the electric power stored in the battery is converted into and used for power to rotate the motor mounted on the rear wheel via the action of a change-over switch, so that charging is made by carrying out a power generation action in the case of being propelled by user's power or going downhill, and rotary force is conveyed to the rear wheel when charging is made to obtain an electrical driving force to make it possible to use the bicycle conveniently.

A bicycle is a collective name of relatively light-weight two-wheeled vehicles in which a front wheel and a rear wheel are connected by pipes and the rear wheel is connected to a pedal via a chain sprocket, a derailleur and a chain. When the rider pushes on the pedal, power is conveyed to the rear wheel to generate the driving force of bicycle.

In such a bicycle, the front wheel is connected via a front fork that is connected downward to the lower end of a head pipe, and the rear wheel is connected via a fixed pipe and rear fork that together support a seat. The head pipe and fixed pipe are connected via the combination of a main pipe, support pipe and down pipe.

A handle is placed laterally at the upper end of the head pipe, and handlebars are fixed at the opposite ends of the handle. The chain sprocket and pedal are rotatably joined to the lower end of the down pipe and support pipe, and the derailleur and chain stay are joined to the rotating axis of the rear wheel that is connected to the lower end of the rear fork.

However, such an ordinary bicycle obtains a driving force by relying on a genuine power of user's feet, so riding a bicycle for a long time or moving a long distance causes a feeling of extreme fatigue. Especially for a beginner, there is a problem that long-time or long-distance riding is impossible.

And in order to overcome the limitations that a bicycle has for an uphill path, a multi-stage derailleur is adopted to make it relatively easy to climb a hill or an uphill road. But such a derailleur increases the number of revolutions from the force of pedal conveyed by a chain sprocket, and obtains a force proportional to it to make it possible to climb a hill. Because of this, physical strength is consumed proportionally, and still more kinetic force is required.

Therefore, a recent trend is the marketing of electric bicycles in which driving force is automatically generated by mounting a separate electromotive means on the bicycle and providing the rear wheel with a rotary force from the electromotive means.

Such an electric bicycle comprises a battery for storing electricity by using household electricity and an electromotive means that is rotated and driven by applying the battery electricity. Since the rotary force generated from the electromotive means is conveyed to the rear wheel via a power transmission device, it is designed in such a way that running a bicycle is possible without relying on the user's force.

However, such an electric bicycle cannot be used unless charging work is carried out after finishing riding the bicycle. Therefore, it has a problem that excessive power is consumed for charging and the requirement of a long time for charging results in many limitations in use.

Also, in the case of using an electric bicycle for a long distance or a long time, the battery discharges completely to cause the loss of the function as an electric bicycle, then the bicycle should be run by relying on a user's power as in a conventional ordinary bicycle. Therefore, the user will feel more serious fatigue and more momentum and physical power are required as the weight of the electromotive means is added to the weight of the bicycle, so it is not so efficient.

DISCLOSURE

[Technical Problem]

To solve the above-mentioned problems, the present invention is an application of a bicycle having a motor-generator disclosed in Korean Patent Application No. 2009-035298 that the applicant of the present invention filed. Namely, a motor-generator is mounted on a side of the rear wheel of the bicycle, and a control box and a battery are mounted under the main pipe of the bicycle, and a change-over switch and a change speed switch are mounted on the handle of the bicycle.

Accordingly, it is an object of the present invention to provide a bicycle in which charging is made via a motor-generator when pedaling on a downhill or level ground, and electric power of the battery is conveyed to the rear wheel via the motor-generator to rotate it, so that the bicycle can have driving force from the motor-generator that can rationally solve all the problems that the conventional bicycle and electric bicycle had.

[Technical Solution]

In order to accomplish the foregoing objects, the present invention provides a bicycle deriving driving force by a motor-generator having a rotating plate of a nonmagnetic material having a plurality of radially fixed magnets, fixed plates of a nonmagnetic material which are placed on both sides of the rotating plate and have a plurality of horizontally wound coil units corresponding to the magnets, and a rotating axis which is mounted on the center of the rotating plate and at both ends of which are fixed the plates through the bearings, the bicycle comprising: a motor-generator which is mounted on the side of the rear wheel of the bicycle; a power transmission means including a driving pulley which is fixed on the shaft where the rear wheel of the bicycle is rotatably mounted, a driven pulley which is mounted on one end of the rotating axis mounted on the center of the rotating plate, and a belt which operatively connects the driving pulley and the driven pulley; a control box and a battery which are mounted on the bicycle and are connected with the coil units; and a change-over switch which is mounted on the handle of the bicycle and converts the motor-generator in such a way that it can be used selectively as a generator or a motor.

[Advantageous Effects]

The present invention makes it possible to charge quickly and effectively via a motor-generator that is operated by the bicycle driving force on a downhill or level ground, and with charging made, the rotary force of the motor-generator is conveyed to the rear wheel to generate electric power, so that electromotive force is produced and stored by itself, and the driving force of the bicycle can be obtained by using the stored electric power. Therefore, it is possible to use the bicycle easily and conveniently for a long time, and it has an effect of much reduced leg fatigue even in the case of moving a long distance.

DESCRIPTION OF DRAWINGS

The above objects, features and advantages of the present invention will become more apparent to those skilled in the related art in conjunction with the accompanying drawings. In the drawings.

Figure 1:
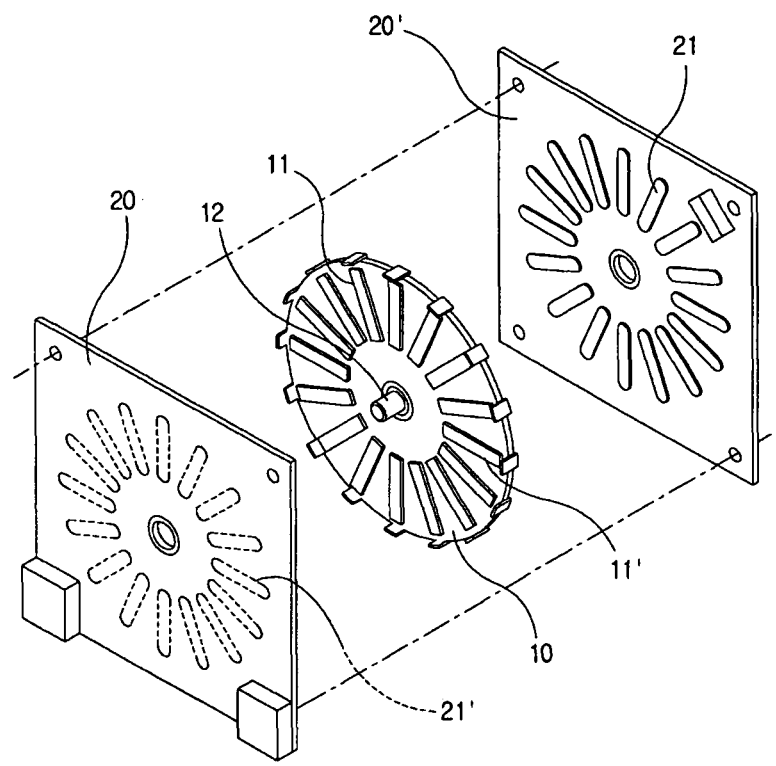
FIG. 1 is an exploded perspective view showing major parts of a conventional motor-generator.

\* Description of Reference Numerals in Drawings

| | | | |
|---|---|---|---|
| 10: | Rotating plate | 11, 11': | Magnet |
| 12: | Rotating axis | 13: | Driven pulley |
| 20, 20': | Fixed plate | 21, 21': | Coil unit |
| 30: | Motor-generator | | |
| 50: | Bicycle | 51: | Rear wheel |
| 52: | Shaft | 53: | Driving pully |
| 54: | Belt | 55: | Handle |
| 56: | Change-over switch | 57: | Speed change switch |
| 60: | Control box | 61: | Transformer |
| 62: | Rectifier diode | 63: | Polarity change-over unit |
| 64: | Phase sensor | 65: | Phase delivery unit |
| 66: | Variable speed unit | 70: | Battery |
| 80: | Support | | |

BEST MODE

Hereinafter, preferred embodiments of the present invention will be described in more detail through the following examples.

Prior to this, terms or words used in the specification and claims should not be construed as limited to a lexical meaning, and should be understood as appropriate notions by the inventor based on that he/she is able to define terms to describe his/her invention in the best way to be seen by others.

FIG. 1 is an exploded perspective view showing major parts of a conventional motor-generator.

The motor-generator disclosed in Korean Patent Application No. 2009-035298 that the applicant of the present invention filed includes a rotating plate 10 on which a plurality of magnets 11 and 11' are radially attached and fixed plates 20 and 20' on which a plurality of coil units 21 and 21' are radially placed and horizontally wound. The fixed plates 20 and 20' are placed in separation at a predetermined interval on both sides of the rotating plate 10. A rotating axis 12 is fitted on the center of the rotating plate 10, and the fixed plates 20 and 20' are rotatably mounted on both ends of the rotating axis 12 by bearings.

Accordingly, when the rotating plate 10 is rotated by the power of pedaling, the electric charge having a predetermined polarity generated from the magnets 11 and 11' is applied to the coil units 21 and 21', and the electricity generated from the coil units 21 and 21' by the electric charge is stored in the battery by way of a transformer and rectifier diode. Therefore, this system can be used as a chargeable generator.

Conversely, when external electricity is applied to the coil units 21 and 21', the electric charge generated from the coil units 21 and 21' interfere with the polarity of the magnets 11 and 11' of the rotating plate 10 to generate attractive force and repulsive force between them. Therefore, it is possible to use the rotating plate 10 as a continuously rotating motor via alternating transfer supply of external electricity.

Figure 2:
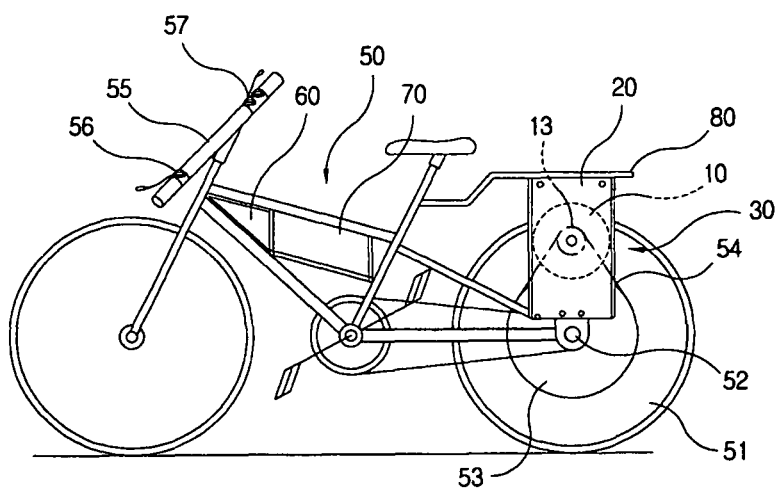
FIG. 2 is a side view showing the overall construction of a bicycle according to the present invention.
Figure 3:
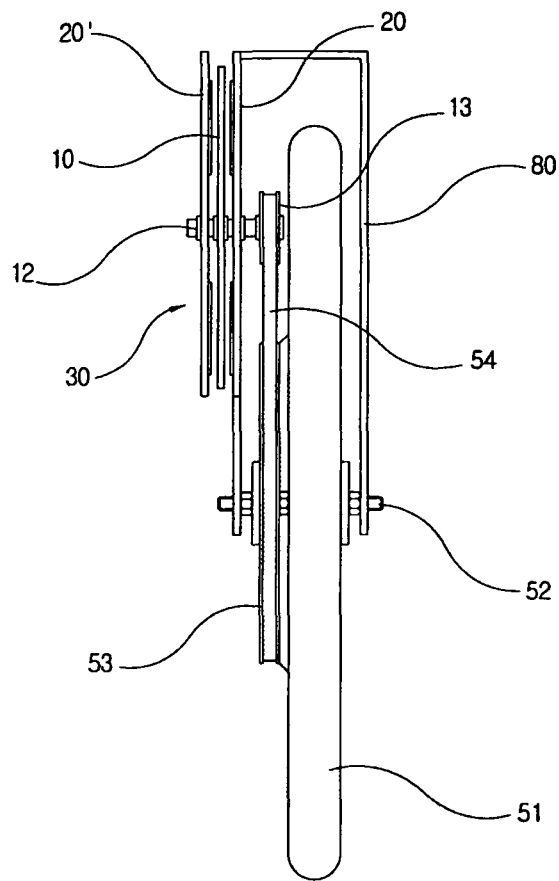
FIG. 3 is an enlarged rear view showing the rear wheel of the bicycle according to the present invention.
Figure 4:
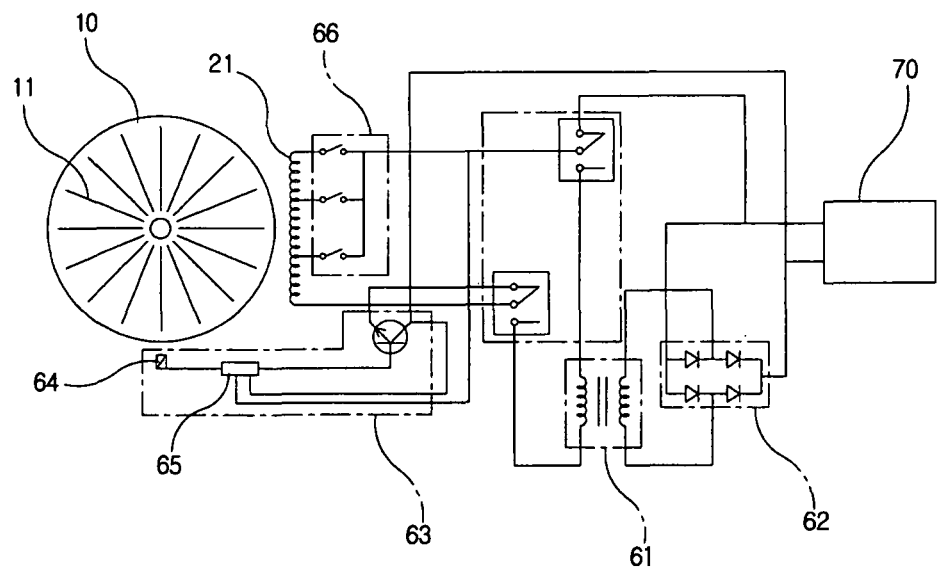
FIG. 4 is a circuit diagram showing an electromotive means of the bicycle according to the present invention.

FIG. 2 is a side view showing the overall construction of a bicycle according to the present invention, and FIG. 3 is an enlarged rear view showing the rear wheel of the bicycle according to the present invention, and FIG. 4 is a circuit diagram showing the electromotive means of the bicycle according to the present invention.

As described above, a motor-generator 30 having the rotating plate 10 and fixed plates 20 and 20' are mounted on the side of the rear wheel 51 of the bicycle 50. A separate driving pulley 53 is fixed together on the shaft 52 where the rear wheel 51 of the bicycle 50 is rotatably installed. A separate driven pulley 13 is fixed on one end of the rotating axis 12 that is mounted on the center of the rotating plate 10. In this state, by operatively connecting the driving pulley 53 and driven pulley 13 via the belt 54, power transmission between the rotating body and rear wheel is made by these power transmission means.

In particular, by adjusting the rotation ratio of the driven pulley 13 and driving pulley 53, electricity generation or electromotive efficiency can be improved. Namely, by forming the diameter of the driven pulley 13 to be small and the diameter of the driving pulley 53 to be large, the driven pulley 13 rotates more while the driving pulley 53 makes one rotation. Therefore, a larger quantity of electricity storage is possible during generation, and an increase of rotary force is possible during electromotive operation.

And it is preferable to use a timing belt for the belt 54 for more accurate transmission of rotary force. Also for the driven pulley 13 and driving pulley 53 that are operatively connected via the timing belt, it is preferable that they have sawteeth in a form corresponding to the timing belt. Any kind of construction that can transmit power, such as the timing belt 54, driven pulley 13 and driving pulley 53, can be used. For example, besides the structure of timing belt as described above, a power transmission structure with a chain and sprocket can also be used.

In the process of mounting a motor-generator 30 on one side of the rear wheel 51 of the bicycle 50, the lower end of one fixed plate 20 is fastened directly to the shaft 52 of the rear wheel 51, and the upper end of the fixed plate 20 is installed by using a separate support 80 that is fixed to the bicycle 50. Accordingly, the motor-generator 30 can maintain a stable fixed state for the bicycle 50, and a control box 60 and battery 70 connected to the motor-generator 30 can be mounted in the necessary portion of the bicycle 50.

In addition, on the handle 55 of the bicycle 50 are mounted a change-over switch 56 for selective use of a motor or generator and a speed change switch 57 that can adjust the rotation velocity of the motor 40 in case the motor-generator 30 is used as a motor.

In the bicycle of the present invention having such a construction, storage of electricity is made by a transformer 61 and a rectifier diode 62 in the control box 60, and the motor is driven by a polarity change-over unit 63 and variable speed unit 66 with a phase sensor 64 and phase delivery unit 65.

Figure 5:
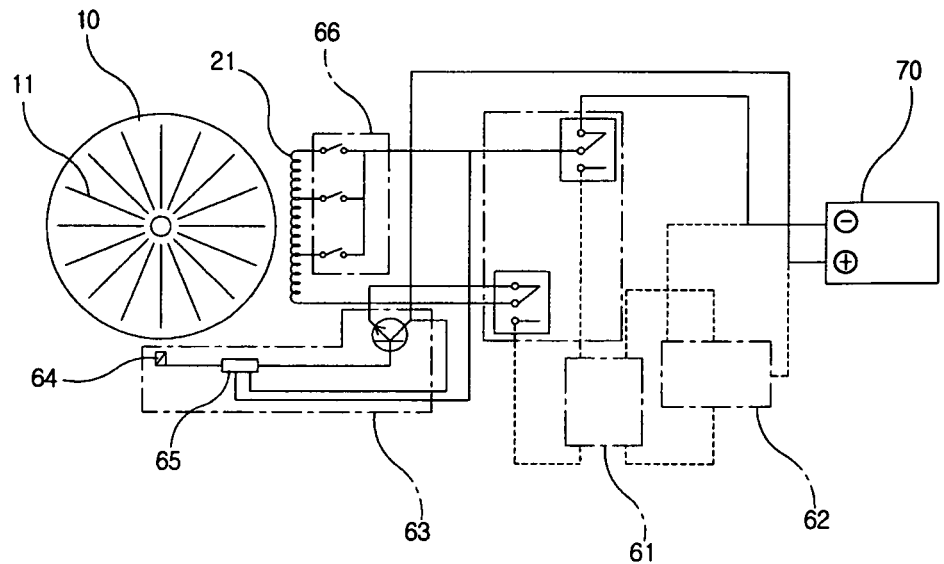
FIG. 5 is a circuit diagram showing the state in which driving force is provided by the electromotive means in the bicycle according to the present invention.

Namely, as shown in FIG. 5, with the battery 70 sufficiently charged, the change-over switch 56 mounted on the handle of the bicycle 50 is operated to have the electricity of the battery 70 applied to the coil units 21 and 21' of the fixed plates 20 and 20', then the rotating plate 10 is forced to rotate by attractive force and repulsive force acting in polarity between the electric charges acting on coil units 21 and 21' and magnets 11 and 11'.

At this time, the electricity of the battery 70 is supplied by repeatedly changing the polarity by the polarity change-over unit 63, so that the rotating plate 10 can have rotary force of the same direction continuously. Also, the polarity change-over unit 63 is connected to the phase sensor 64 that detects the phase of magnets 11 and 11' and the phase delivery unit 65 that delivers the detected signal of the phase sensor 64. Therefore, as the magnets 11 and 11' of the rotating plate 10 start rotating, the polarity of the electricity provided from the battery 70 is continuously changed to be supplied to the coil units 21 and 21'. As a result, the rotating plate 10 is continuously rotated by the attractive force and repulsive force action on the magnets 11 and 11'.

Especially, to the coil units 21 and 21' placed radially on the fixed plates 20 and 20' electricity is supplied selectively by a separate variable speed unit 66. At this time, the rotation velocity and the rotary torque for the rotating plate 10 can be adjusted by supplying the electricity applied to the coil units 21 and 21' via the variable speed unit 66 in an individual or group mode.

Such a variable speed unit 66 can be controlled via the speed change switch 57 mounted on the handle 55 of the bicycle 50. Namely, the rotary velocity and rotary force of the rotating plate 10 can be increased or decreased by changing the supply mode of the electricity applied to each of the coil units 21 and 21' whenever the speed change switch 57 is operated.

Such a rotation structure of the rotating plate 10 by the battery 70 is described in detail in the above-mentioned preceding patent application.

Therefore, as the rotating plate 10 is rotated by using the battery 70 as described above, the driven pulley 13 and the driving pulley 53 rotate via the timing belt, and the rotary force of the driving pulley 53 is directly transmitted to the rear wheel 52, so that it can be rotated by rotary force.

So in the case of an uphill or level ground, it is possible to use a bicycle conveniently by operating the motor-generator 30 in such a way that it plays a role of a motor.

Figure 6:
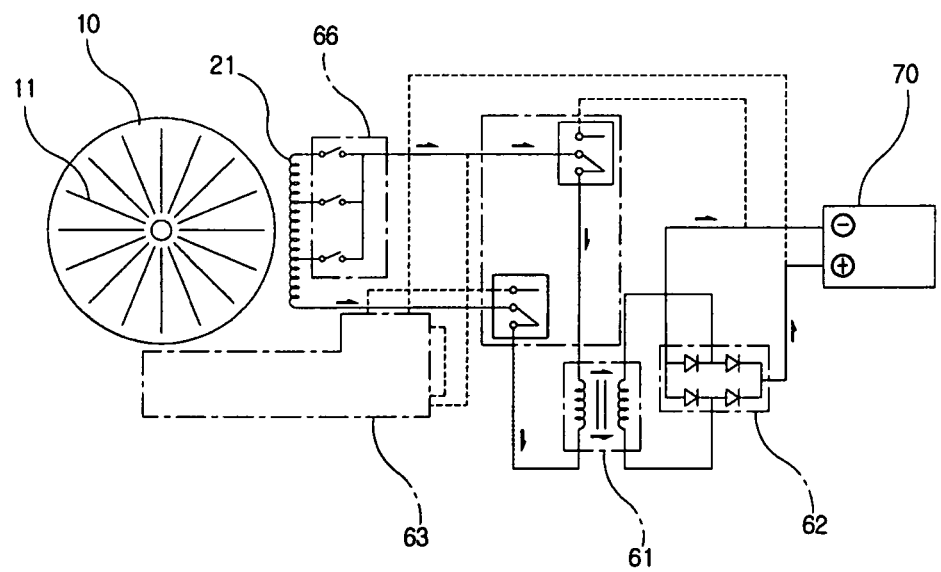
FIG. 6 is a circuit diagram showing the state in which electric power is generated by driving force in the bicycle according to the present invention.

FIG. 6 is a circuit diagram showing the state in which generation is made by the driving force in the bicycle according to the present invention. In the case of riding downhill or level ground, the user can charge the battery 70 as necessary.

Namely, riding is possible without pedaling and only with the weight of the user and the weight of the bicycle itself when going downhill. In such a case, the change-over switch 56 mounted on the handle 55 is operated to have the motor-generator 30 play a role of a generator.

Here, the change-over switch 56 can be operated by the user pressing it personally, or it can be configured in such a way that the change-over switch 56 is automatically operated when going downhill for automatic change-over from the function of motor to the function of generator, by mounting on the bicycle a change-over switch 56 of a type operating according to the angle with respect to the horizon.

As the function is changed to that of a generator, the rotary force of the rear wheel 51 is transmitted to the rotating plate 10 to rotate it by force, and then the magnets 11 and 11' of the rotating plate 10 affect the coil units 21 and 21' of the fixed plates 20 and 20' to generate an electric charge. As described above, the electric charge generated from the coil units 21 and 21' is rectified by way of the transformer 61, and alternating current is converted to direct current by the rectifier diode 62 to have the battery 70 charged automatically.

In particular, since the above-described motor-generator 30 rotates in a free running mode in which interference resistance between the magnets 11 and 11' of the rotating plate 10 and the coil units 21 and 21' of the fixed plates 20 and 20' does not occur at all, the running power of the bicycle is not affected even while the above-described generation action is being carried out.

Thus, the bicycle of the present invention makes selective operation as a motor or a generator possible on terrain such as downhill or uphill, so long-time or long-distance riding through continuous charging are possible as well as convenient use of the bicycle.

Figure 7:
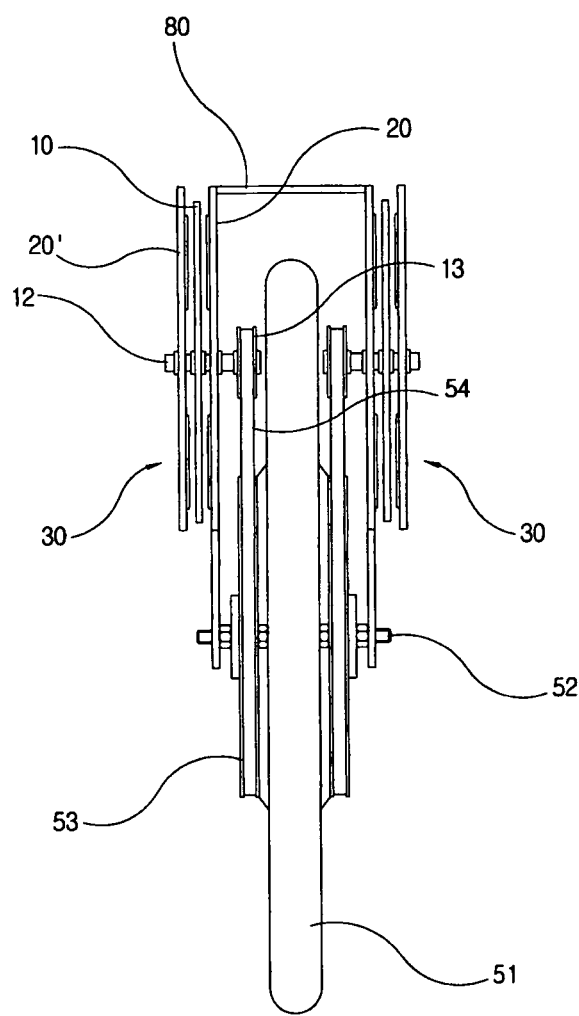
FIG. 7 is an enlarged rear view showing the rear wheel of the bicycle according to an embodiment of the present invention.

Also, as shown in FIG. 7, the motor-generators 30 of the present invention can be mounted on both sides of the rear wheel 51 as well by using supports 80. In this case, much higher electromotive force or generation efficiency can be obtained by the motor-generators 30 on both sides, so the role as an electromotive bicycle can be achieved more sufficiently.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

The invention claimed is:

1. A bicycle deriving driving force by a motor-generator having a rotating plate (10) of a nonmagnetic material having a plurality of radially fixed magnets (11, 11'), fixed plates (20, 20') of a nonmagnetic material which are placed on both sides of the rotating plate (10) and have a plurality of horizontally wound coil units (21, 21') corresponding to the magnets (11, 11'), and a rotating axis (12) which is mounted on a center of the rotating plate (10) and at both ends of which are fixed the plates (20, 20') through the bearings, the bicycle comprising:
   a motor-generator (30) which is mounted on a side of a rear wheel of the bicycle (50);
   a power transmission means including a driving pulley (53) which is fixed on a shaft (52) where the rear wheel (51) of the bicycle (50) is rotatably mounted, a driven pulley (13) which is mounted on one end of the rotating axis (12) mounted on the center of the rotating plate (10), a belt (54) which operatively connects the driving pulley (53) and the driven pulley (13);
   a control box (60) and a battery (70) which are mounted on the bicycle (50) and are connected with the coil units (21, 21');
   a change-over switch (56) which is mounted on the handle (55) of the bicycle (50) and converts the motor-generator in such a way that it can be used selectively as a generator or a motor, and
   a bend shaped support (80) includes a lower end and an upper end, the lower end is fixed on the shaft (52) and the upper end is fixed to the bicycle (50), and the fixed plate (20) is joined to the support (80),
   wherein the coil units (21, 21') formed on the fixed plate (20, 20') are connected by a variable speed unit (66) that controls the short-circuit form of the electricity applied to the coil units (21, 21'), and the variable speed unit (66) is controlled and operated by a speed change switch (57) mounted on the handle (55) of the bicycle (50).

2. The bicycle according to claim 1, wherein the control box (60) has a transformer (61) and a rectifier diode (62)

embedded therein, so that when an electric charge is induced in the coil units (21, 21') by the rotating plate (10) that is rotated together with the rear wheel (51), it is stored in the battery (70) via the transformer (61).

3. The bicycle according to claim 1, wherein the control box (60) has a polarity change-over unit (63) embedded therein, so that according as polarity applied to the coil units (21, 21') from the battery (70) is alternately changed, the rotating plate (10) is rotated by an attractive force and repulsive force acting between magnets (11, 11') and coil units (21, 21').

4. The bicycle according to claim 3, wherein the polarity change-over unit (63) is operated on the base of the delivery signals from a phase sensor (64) that detects the phase of the magnets (11, 11') fixed to the rotating plate (10) and a phase delivery unit (65) that is connected with the phase sensor (64).

5. The bicycle according to claim 1, wherein the motor-generator (30) is mounted on one side of the rear wheel (51) of the bicycle (50).

6. The bicycle according to claim 1, wherein the motor-generators (30) are mounted on both sides of the rear wheel (51) of the bicycle (50).

\* \* \* \* \*